J. Mc Collum,
Cracker Machine,
No. 730. Reissued May 31, 1859.
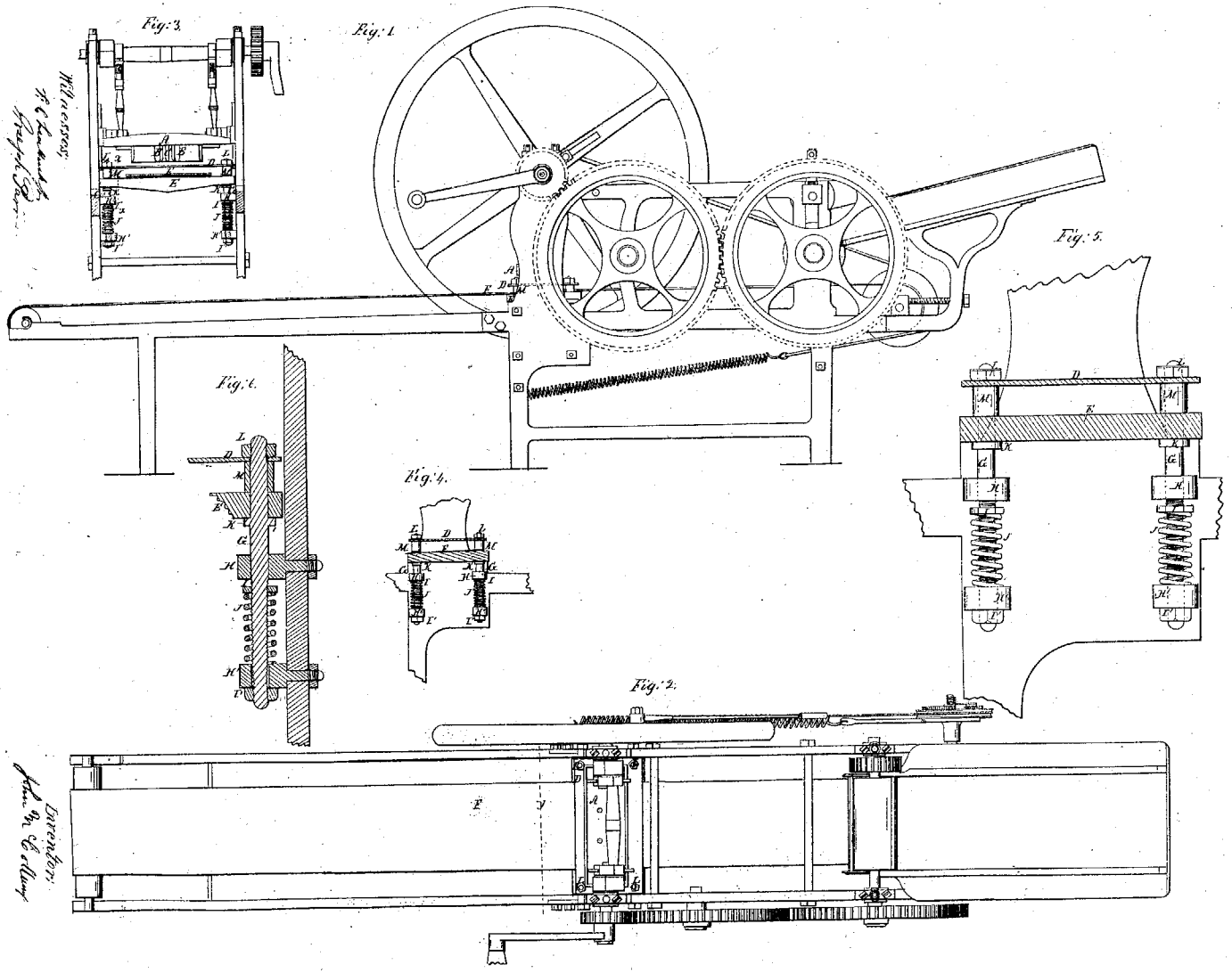
N. PETERS, PHOTO-LITHOGRAPHER, WASHINGTON, D. C.

UNITED STATES PATENT OFFICE.

JOHN McCOLLUM, OF NEW YORK, N. Y.

IMPROVEMENT IN CRACKER-MACHINES.

Specification forming part of Letters Patent No. 8,828, dated March 23, 1852; Reissue No. 730, dated May 31, 1859.

*To all whom it may concern:*

Be it known that I, JOHN McCOLLUM, of the city and county of New York, in the State of New York, have made a certain new and useful Improvement in Cracker-Machines; and I do hereby declare that the following is a full, clear, and exact description thereof, reference being had to the annexed drawings, forming a part of this specification, and to the letters of reference thereon.

My invention consists in combining a cracker-cutter and the bed against which it acts when cutting with adjustable springs, to make yielding pressure at the point of impingement, which occurs a little before the cutter has reached the termination of its downward stroke, so that after the cracker is cut the edges of the cutters or molds remain a short time in contact with the surface against which they impinge, insuring a more perfectly-formed cracker than would result if the cutter merely impinged against the bed or resisting surface at the termination of its downward stroke.

The springs are made adjustable in two ways: First, to regulate the duration of the contact of the cutting and resisting surfaces, and, second to regulate the force of their yielding pressure during contact.

To describe my invention more particularly I will refer to the annexed drawings, which represent a well-known form of cracker or biscuit machine consisting of a feeding-table, a pair of reducing-rollers, a carrying-apron, and a reciprocating cracker-cutter and bed having my improvement in combination. Figure No. 1 shows a longitudinal elevation of the machine; Fig. No. 2, a plan view of the same; Fig. No. 3, a front view and section through red line *y*, Fig. 2; Fig. No. 4, a view from between the side frames and section through red line *x x*, Fig. 3; Fig. No. 5, a larger view of Fig. 4, showing the adjusting-screw I turned down so as to compress the spring; Fig. 6, a section of spring and column.

Letter A represents a reciprocating segmental cracker-cutter provided with cutters or molds B and docker-teeth C, as usual.

D is a clearer or discharging-plate, having perforations (not seen in the drawings) corresponding with the cutters and docker-teeth.

E is a bed-plate, against which the cutter acts, the dough to be cut being intermittently fed forward in a continuous sheet by the intervening carrying-apron F.

Letters G represent four vertical columns, respectively sliding in holes in lugs H H′, which are screwed to the side frames of the machine. On the lower part of each column a screw is cut, and furnished with screw-nuts I I′, which act to compress the helical springs J, the lower ends of which rest on the lower lugs, H′. The upper ends of the columns pass through holes in the corners of the bed, the bed being sustained by the fixed collars K, and secured to the columns by the screws and nuts L and slip collars or washers M, which last also, in conjunction with the screws and nuts L, hold the clearer-plate in its proper place. By turning the screw-nuts I′ the bed may be raised or lowered at pleasure, so that the length of time that the cutters remain in contact with the resisting surface (by reason of the yield of the springs) may be regulated with the greatest precision. By turning the screw-nuts I the force of the action of the springs may be increased or diminished without altering the relation of the cutting and resisting surfaces to each other as respects the duration of their contact with each other. By thus keeping the cutting and resisting surfaces in contact with each other a short time with spring pressure the crackers are more perfectly cut and their edges pressed by the beveled inside surfaces of the cutters, and with much less force than is requisite where a yielding pressure is not used, thereby saving the carrying-apron from wear.

In the use of springs there is another advantage—viz., the capacity of the cutting and resisting surfaces to yield readily to extraordinary strains to which they are constantly subjected by flour-barrel chips and nails getting in the dough and under the cutters, which are not generally sharp enough to cut through nails and chips.

Although I have described what I consider the best form of my invention as applied to biscuit and cracker machines, I do not wish to be understood as limiting myself to any specific form of construction, but will adopt any convenient arrangement by which the cutting and resisting surfaces in cracker-machines can be combined with adjustable springs, substantially as herein described.

What I claim as my invention, and desire to secure by Letters Patent of the United States, is—

The combination of adjustable springs with a cracker-cutter and its resisting surface or bed substantially as hereinbefore described, and substantially for the purposes hereinbefore set forth.

JOHN McCOLLUM.

Witnesses:

F. C. TREADWELL, JR.
JOSEPH PARR,
G. G. TAYLOR.